United States Patent
Yeh

(10) Patent No.: US 8,296,502 B2
(45) Date of Patent: Oct. 23, 2012

(54) DATA MANAGEMENT METHOD FOR FLASH MEMORY AND STORAGE SYSTEM AND CONTROLLER USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 791 days.

(21) Appl. No.: 12/241,378

(22) Filed: Sep. 30, 2008

(65) Prior Publication Data

US 2009/0327585 A1    Dec. 31, 2009

(30) Foreign Application Priority Data

Jun. 26, 2008  (TW) ................................ 97123978 A

(51) Int. Cl.
    *G06F 13/16*  (2006.01)
(52) U.S. Cl. .................... 711/103; 365/185.33; 711/165; 711/203; 711/206
(58) Field of Classification Search .................... 711/103, 711/165, 203, 206; 365/185.33
    See application file for complete search history.

(56) References Cited

U.S. PATENT DOCUMENTS

| | | | |
|---|---|---|---|
| 6,000,006 A * | 12/1999 | Bruce et al. .................... 711/103 |
| 7,454,670 B2 * | 11/2008 | Kim et al. ..................... 714/710 |
| 2003/0101327 A1 * | 5/2003 | Beck .............................. 711/206 |
| 2004/0068522 A1 * | 4/2004 | Daniels et al. ................ 707/200 |
| 2005/0160223 A1 | 7/2005 | Chen et al. |
| 2006/0161723 A1 * | 7/2006 | Sena et al. ..................... 711/103 |
| 2007/0050536 A1 * | 3/2007 | Kolokowsky ................. 711/103 |
| 2007/0097774 A1 | 5/2007 | Mitani et al. |

OTHER PUBLICATIONS

"Office Action of Taiwan Counterpart Application", issued on Aug. 16, 2012, p1-p6, in which the listed references were cited.

\* cited by examiner

*Primary Examiner* — Jae Yu
(74) *Attorney, Agent, or Firm* — J.C. Patents

(57) ABSTRACT

A data management method, a flash memory storage system and a controller using the same are provided. The data management method is used for accessing a flash memory of the flash memory storage system, wherein the flash memory includes a plurality of physical blocks and the physical blocks are grouped into a data area and a spare area. The data management method includes configuring a plurality of logical blocks for be accessed by a host. The data management method also includes dividing each physical block into a plurality of physical parts and mapping the logical blocks to the physical parts. The data management method further includes accessing the mapped physical parts according to the physical blocks to be accessed by the host. Accordingly, it is possible to increase the usage and the accessing speed of the physical blocks in the flash memory storage system.

14 Claims, 7 Drawing Sheets

DATA MANAGEMENT METHOD FOR FLASH MEMORY AND STORAGE SYSTEM AND CONTROLLER USING THE SAME

CROSS-REFERENCE TO RELATED APPLICATION

This application claims the priority benefit of Taiwan application serial no. 97123978, filed on Jun. 26, 2008. The entirety of the above-mentioned patent application is hereby incorporated by reference herein and made a part of this specification.

BACKGROUND

1. Technology Field

The present invention relates to a data management method. More particularly, the present invention relates to a data management method for accessing a flash memory, and a storage system and a controller using the same.

2. Description of Related Art

With a quick developing of digital camera, cell phone camera and MP3, demand of storage media by customers is increased greatly. Since a flash memory has the advantages of non-volatile, energy saving, small size and none mechanical structure etc., it is suitable for portable applications, and especially for portable battery-powered products. A memory card is a storage device applying an NAND flash memory as a storage medium thereof. Since the memory card has the advantages of small size, great capacity and easy to carry, it is widely applied for storage of important personal data. Therefore, the flash drive industry becomes a hot industry within the electronics industry recently.

Generally, the flash memory is divided into a plurality of physical blocks, and the physical blocks are grouped into a data area and a spare area, for example, a data area 204 and a spare area 206 shown in FIG. 1A. The physical blocks of the data area may store valid data written in response to a writing command, and the physical blocks of the spare area are used for substituting the physical blocks of the data area while executing the writing command. To perform a data accessing to the physical blocks storing data in an alternation approach for a host, the flash memory storage system may provide logical blocks (e.g. a plurality of logical blocks 210 in FIG. 1A) to the host for the data accessing. To be specific, the flash memory storage system maintains a logical-physical block mapping table for recording a mapping relation between the logical blocks and the physical blocks, wherein a logical block maps to a physical block grouped into the data area. Meanwhile, when the writing command is executed so that the physical blocks of the data area is exchanged to the physical blocks of the spare area, the flash memory storage system can update the logical-physical block mapping table for follow-up accessing.

FIG. 1A and FIG. 1B are schematic diagrams illustrating alternating of physical blocks of a flash memory according to a conventional technique.

Referring to FIG. 1A, if data is again written to a block written with data, an erase operation is first executed. However, in the flash memory, a writing unit (i.e. a page) is less than an erasing unit (i.e. a block), and therefore when the erase operation of the physical blocks is about to be executed, data in a valid page in the physical block has to be copied to another physical block, first. For example, if the host is about to write data into a logical block L of the configured logical blocks 210, the flash memory storage system then acquires that the logical block L is presently mapped to a physical block M in the data area 204 via the logical-physical block mapping table. Therefore, the flash memory storage system then updates data in the physical block M, wherein the flash memory storage system selects a physical block C from the spare area 206 to substitute the physical block M of the data area 204. However, when the new data is written into the physical block C, all of the valid data in the physical block M is not immediately moved to the physical block C to erase the physical block M. To be specific, the valid data (i.e. pages P0 and P1) in the physical block M before the address for writing the new data is copied to the physical block C (shown as (a) of FIG. 1B), and the new data (i.e. pages P2 and P3 of the physical block C) is written into the physical block C (shown as (b) of FIG. 1B). Now, the physical block C containing a part of the valid old data and the written new data is temporarily linked as a substitute physical block 208. This is because the valid data of the physical block M can be invalid in a next operation (for example, executing a writing command), and accordingly immediate movement of all of the valid data in the physical block M to the physical block C is unnecessary. In the present embodiment, a combination of the contents of the physical block M and the physical block C is the content of the mapped logical block L. Such a temporary mother-child block (i.e. the physical block M and the physical block C) relationship can be determined according to a size of a buffer memory in a controller. For example, there may be five child blocks.

Thereafter, the physical block M and the physical block C are only integrated into one block when the contents in the physical block M and the physical block C are to be actually combined, so as to improve a utilization efficiency of the blocks. For example, as shown in (c) of FIG. 2C, to integrate the blocks, the remaining valid data in the physical block M (i.e. pages P4~PN) is coped to the physical block C, and then the physical block M is erased and linked to the spare area 206. Meanwhile, the physical block C is linked to the data area 204, and in the logical-physical block mapping table, the logical block L is changed for mapping to the physical block C. By now integration of these blocks is completed.

Since a programming specification of the flash memory requests that data has to be written in each physical block from a first page to a last page and each bit can only be programmed once (i.e. can only be programmed from "1" to "0"). Accordingly, once data is written into a page of a physical block, a physical block has to be selected from the spare area 206 (as shown in FIG. 1A) and the steps shown in FIG. 1B have to be repeated in order to update the data written into this page. Thereby, when the integration operation as illustrated in (c) of FIG. 1B is not yet performed to the physical blocks (i.e. the physical blocks are in the temporary state shown in (b) of FIG. 1B) and the newly moved data has to be updated (for example, pages P0~P1 of FIG. 1B), the moved old data has to be moved again, which is referred to as a random writing mode. For example, a file allocation table (FAT) is usually used in a storage apparatus for managing a storage media, wherein the FAT data is accessed frequently. Accordingly, the random writing mode may be entered if the newly moved data is constantly renewed when the FAT table is accessed. In the random writing mode, the controller may sequentially write the data to be written into the pages of the physical block C, and movement of the valid data as shown in (a) of FIG. 1B is not performed, and only when the random writing mode is ended, is integration of the valid data performed, so as to avoid repeatedly executing the operations of FIG. 1A and FIG. 1B in the random writing mode.

Since a physical block in the flash memory maps to a logical block, when the logical blocks enters the random writing mode, the data to be written is only recorded in one physical block. However, the data frequently updated during the random writing mode is a small amount of data, and with progresses of a fabrication process of the flash memory, design volumes of the programming unit and the erasing unit become larger, so that utilization efficiency of the physical blocks during the random writing mode is decreased.

SUMMARY

Accordingly, the present invention is directed to a block accessing method, by which utilization efficiency of physical blocks and block accessing speed can be improved.

The present invention is directed to a controller, which may apply the aforementioned data management method for accessing a flash memory, so as to improve a utilization efficiency of physical blocks and a block accessing speed.

The present invention is directed to a storage system, which may apply the aforementioned data management method for accessing a flash memory, so as to improve a utilization efficiency of physical blocks and a block accessing speed.

The present invention provides a data management method, which is used for accessing a flash memory of a flash memory storage system, wherein the flash memory includes a plurality of physical blocks and the physical blocks are at least grouped into a data area and a spare area. The data management method includes configuring a plurality of logical blocks for being accessed by a host. The data management method also includes dividing each of the physical blocks into a plurality of physical parts and mapping the logical blocks to the physical parts. The data management method further includes accessing the mapped physical parts according to the logical blocks to be accessed by the host.

The present invention provides a storage system including a flash memory, a transmission link interface and a controller. The flash memory is used for storing data, wherein the flash memory includes a plurality of physical blocks and the physical blocks are at least grouped into a data area and a spare area. The transmission link interface is connected to a host. The controller is coupled to the flash memory and the transmission link interface, and includes a micro-processing unit, a flash memory interface, a buffer memory and a memory management module. The flash memory interface is coupled to the micro-processing unit for accessing the flash memory. The buffer memory is coupled to the micro-processing unit for temporarily storing data. The memory management module is coupled to the micro-processing unit and has a plurality of machine commands that can be executed by the micro-processing unit for performing the foregoing data management method for the flash memory.

In the present invention, since a structure that multi logical blocks map to a physical block is applied for accessing the blocks of the flash memory, number of times for combining the physical blocks can be reduced, and accordingly the block accessing speed is improved.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

Figure 2:
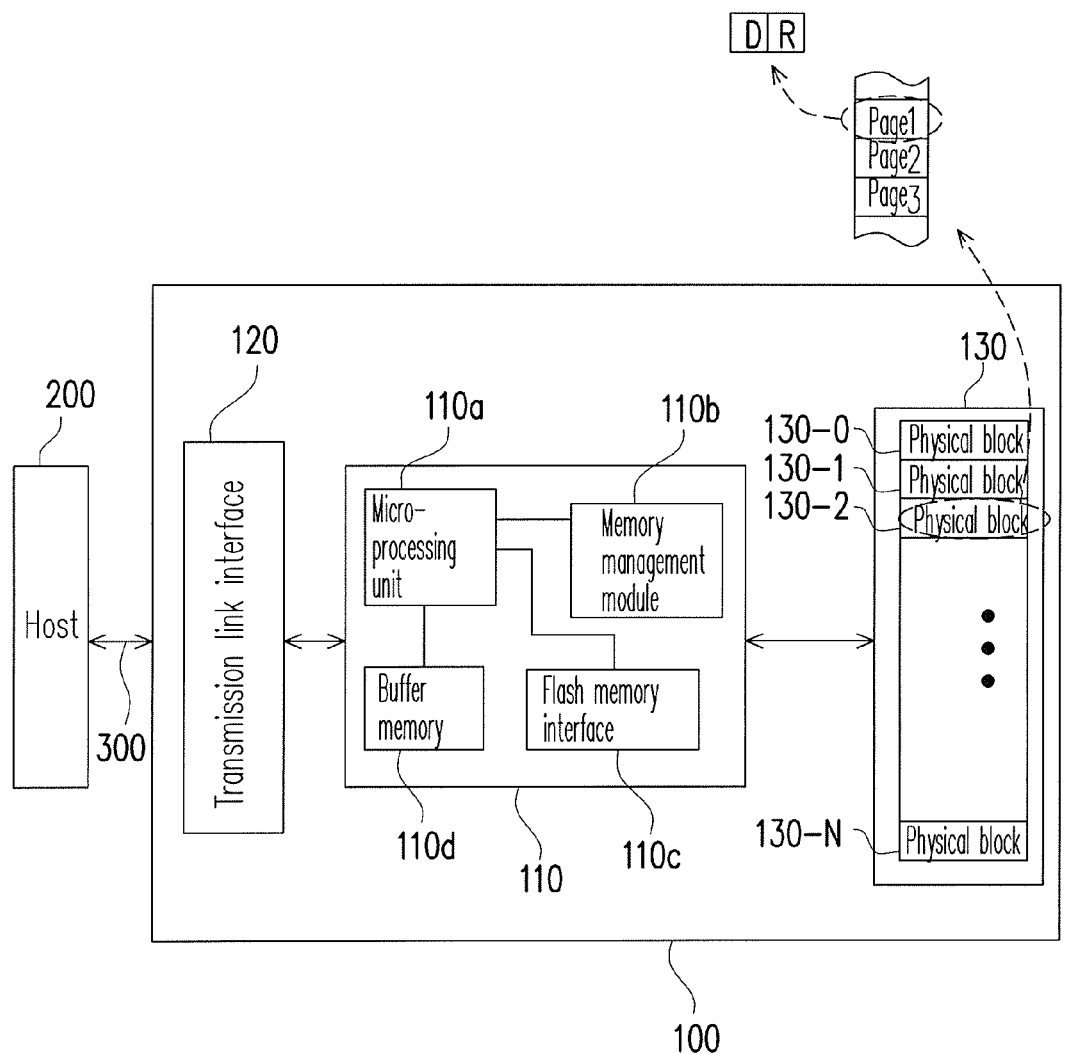
FIG. 2 is a schematic block diagram illustrating a flash memory storage system according to an embodiment of the present invention.

FIG. 2 is a schematic block diagram illustrating a flash memory storage system according to an embodiment of the present invention. Referring to FIG. 2, the flash memory storage system 100 includes a controller 110, a transmission link interface 120 and a flash memory 130.

Generally, the flash memory storage system 100 is utilized together with a host 200, so that the host 200 can write data into the flash memory storage system 100 or read data from the flash memory storage system 100. In the present invention, the flash memory storage system 100 is a solid state drive (SSD). It should be understood that in another embodiment of the present invention, the flash memory storage system 120 can also be a memory card or a flash drive.

The controller 110 may execute a plurality of commands with a hardware type or a software type to perform operations such as data storing, data reading and data erasing, etc. in coordination with the transmission link interface 120 and the flash memory 130. The controller 110 includes a micro-processing unit 110a, a memory management module 110b, a flash memory interface 110c and a buffer memory 110d.

The micro-processing unit 110a is used in coordination with the memory management module 110b, the flash memory interface 110c and the buffer memory 110d to perform various operations of the flash memory storage system 100.

Figure 3:
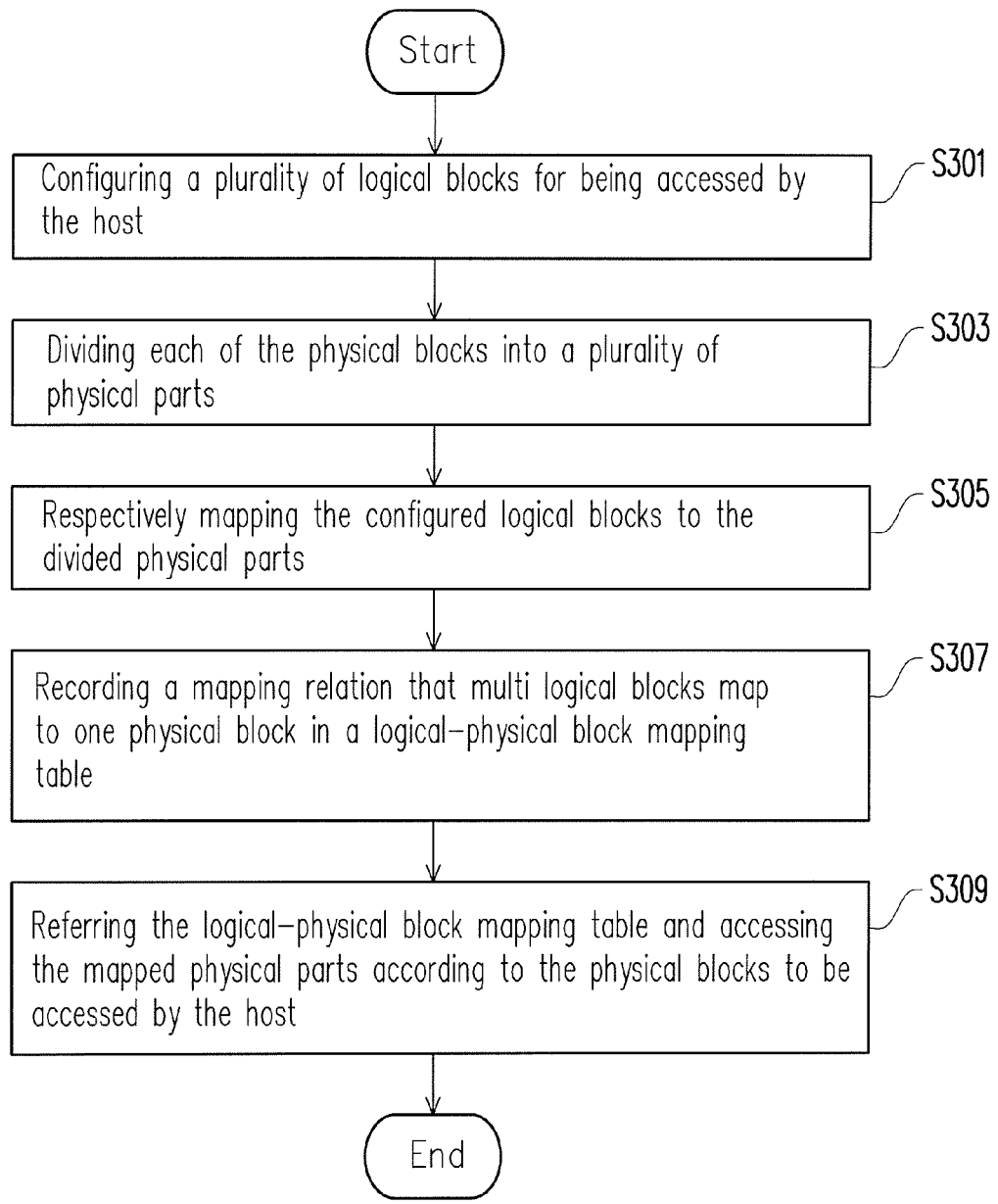
FIG. 3 is a flowchart illustrating a data management method according to an embodiment of the present invention.

The memory management module 110b is coupled to the micro-processing unit 110a. The memory management module 110b has a plurality of machine commands that can be executed by the micro-processing unit 110a for managing the flash memory 130. For example, machine commands are executing for wear levelling, managing bad blocks, maintaining a mapping table, etc. Particularly, in the present embodiment, the memory management module 110b contains machine commands that can implement data management steps (as shown in FIG. 3) of the present embodiment. To be specific, in the present embodiment, the memory management module 110b is embodied in form of firmware within the controller 110, for example, the memory management module 110b is embodied by a program memory (for example, a read only memory (ROM)) and the related machine commands stored therein. During operation of the flash memory storage system 100, the memory management module 110 is loaded into the buffer memory 110d for being executed by the micro-processing unit 110a.

In another embodiment of the present invention, the machine commands of the memory management module 110b can also be stored in a specific area (for example, a system area) of the flash memory 130 in form of the firmware. Similarly, during operation of the flash memory storage system 100, the memory management module 110 is loaded into the buffer memory 110d for being executed by the microprocessing unit 110a. Moreover, in still another embodiment of the present invention, the memory management module 110b can also be embodied in the controller 110 in form of hardware.

The flash memory interface 110c is coupled to the microprocessing unit 110a for accessing the flash memory 130. Namely, data to be written into the flash memory 130 by the host 200 is transformed into a format that can be accepted by the flash memory 130 via the flash memory interface 110c.

The buffer memory 110d is coupled to the micro-processing unit 110a and is used for temporarily storing system data (for example, the logical-physical block mapping table) or data read or written by the host 200. In the present embodiment, the buffer memory 110d is a static random access memory (SRAM). However, it should be understood that the present invention is not limited thereof, and a dynamic random access memory (DRAM), a magnetoresistive random access memory (MRAM), a phase change random access memory PRAM or other suitable memories can also be applied.

Moreover, though not illustrated in figures, the controller 110 may further include general functional modules such as an error correction module and a power supply management module, etc. for controlling the flash memory.

The transmission link interface 120 is configured for connecting to the host 200 via a bus 300. In the present embodiment, the transmission link interface 120 is a PCI express interface. However, it should be understood that the present invention is not limited thereof, and the transmission link interface 120 can also be a USB interface, an IEEE 1394 interface, a SATA interface, an MS interface, an MMC interface, an SD interface, a CF interface, an IDE interface or other suitable data transmission interfaces.

The flash memory 130 is coupled to the controller 110 and is used for storing data. The flash memory 130 is substantially divided into a plurality of physical blocks 130-0 to 130-N. Generally, the physical block is a minimum unit that may be erased within the flash memory. Namely, each block contains a minimum number of memory cells that may be erased together. Each block is generally divided into a plurality of pages, and the page is the minimum unit that can be programmed. It should be noted that according to different designs of the flash memory, the minimum programmable unit can also be a sector. Namely, the page can be divided into a plurality of the sectors, and the sector is the minimum unit that can be programmed. In other words, the page is the minimum unit that data can be written on or read from. Each page generally includes a user data area D and a redundant area R. The user data area is used for storing a user data, and the redundant area is used for storing a system data (for example, an error correcting code (ECC)).

To operate with a size of the sector of the disk drive, the user data area D is generally 512 bytes, and the redundant area is generally 16 bytes. Namely, one page is one sector. However, the page may also include a plurality of the sectors, for example, one page may include 4 sectors.

Generally, the block may include arbitrary number of pages, for example, 64 pages, 128 pages, 256 pages, etc. The physical blocks 130-0~130-N are generally grouped into a plurality of zones, and managing of the memory based on the zones results in the fact that the zones can be operated independently, so as to increase a parallel degree of operation, and simplify a complexity of management.

Figure 1A:
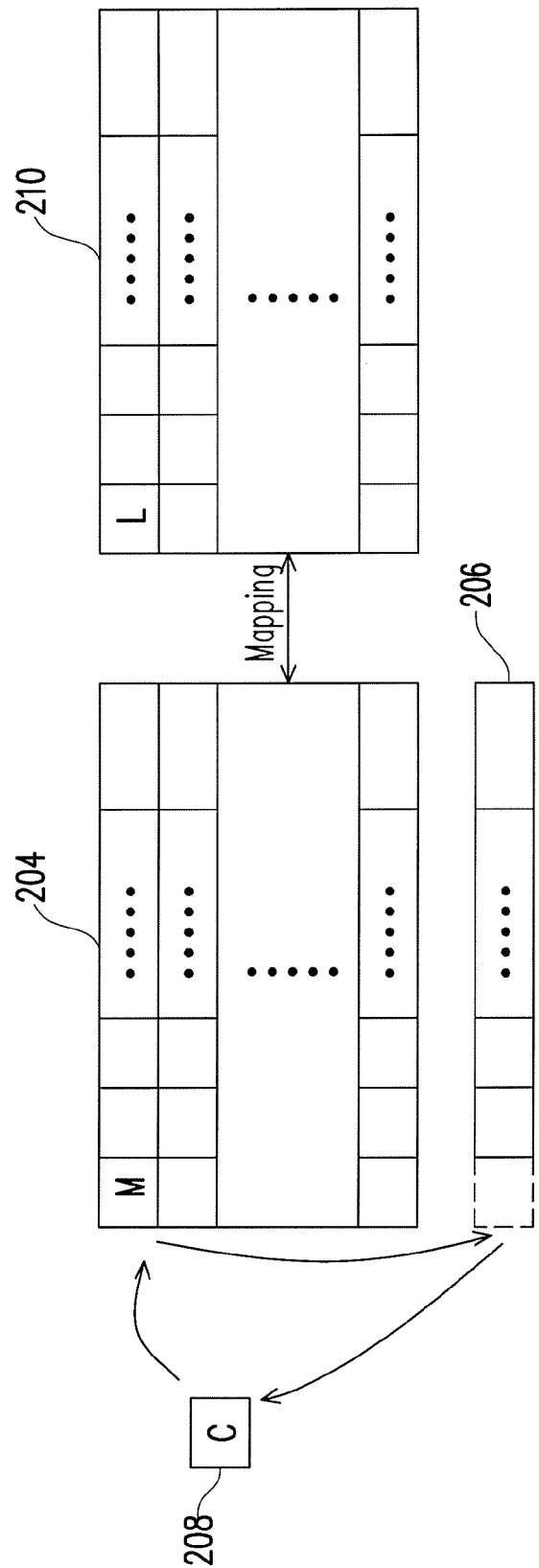
FIG. 1A and FIG. 1B are schematic diagrams illustrating alternating of physical blocks of a flash memory according to a conventional technique.
Figure 1B:
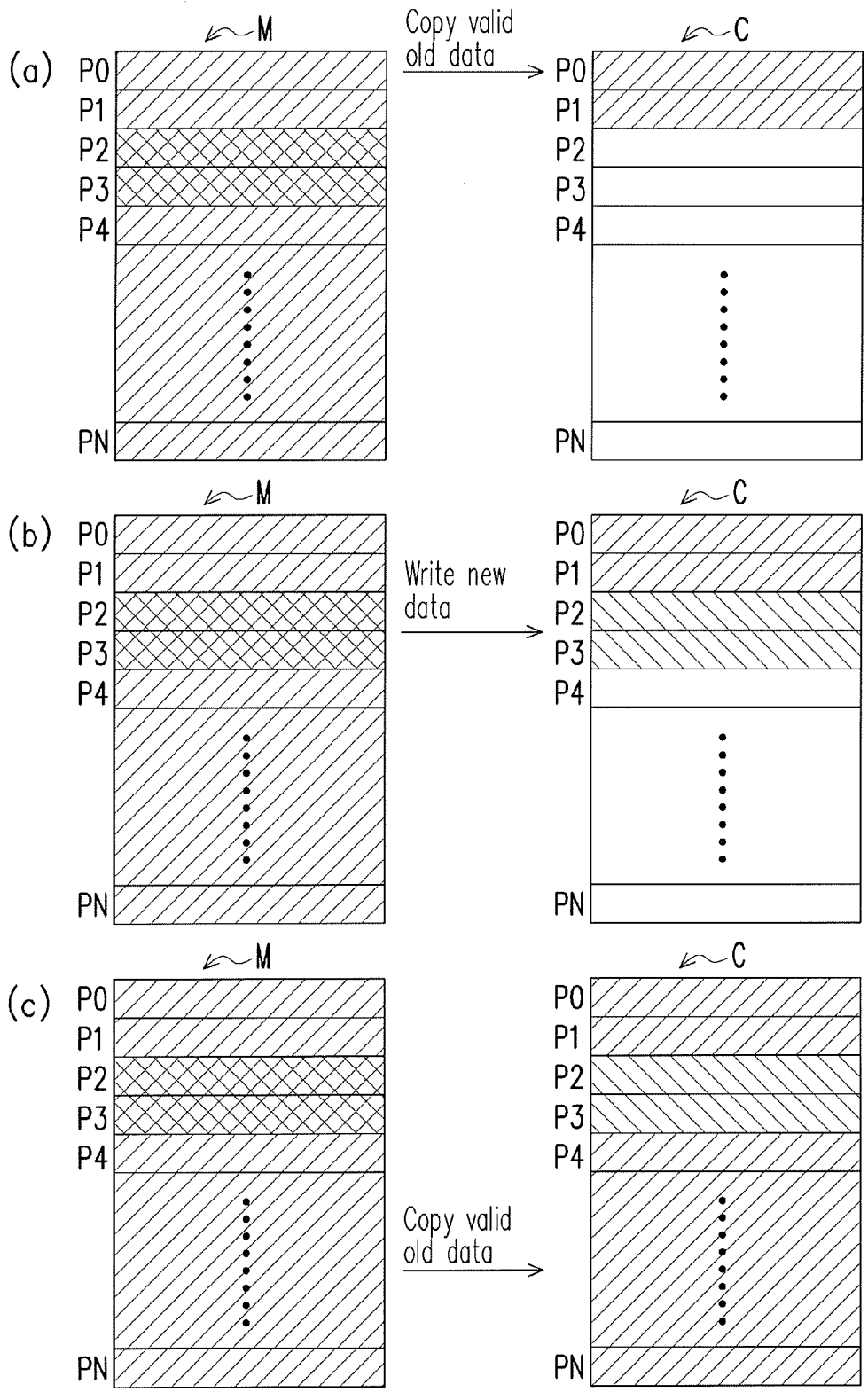
Figure 4:
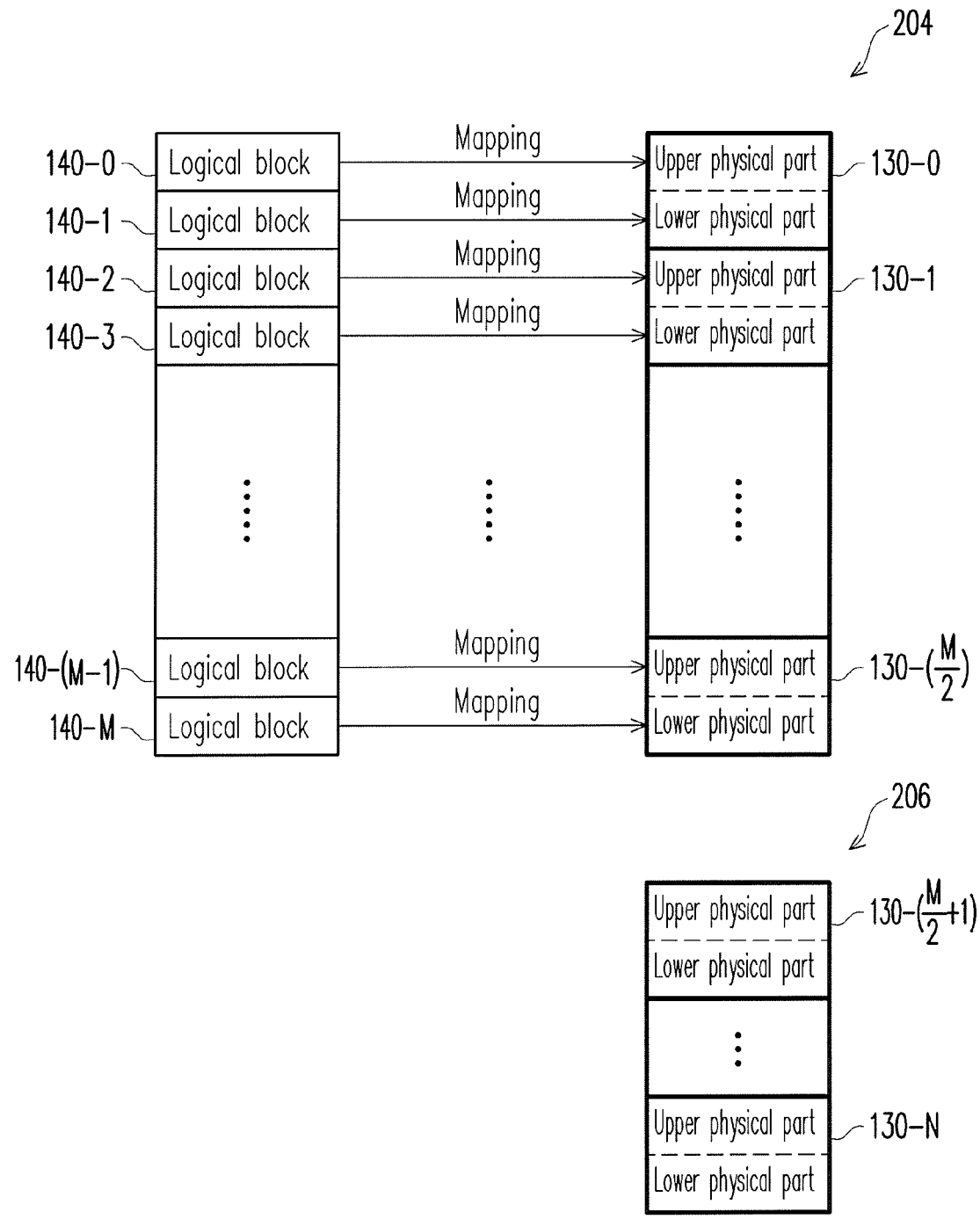
FIG. 4 is a schematic diagram illustrating a mapping relationship between logical blocks and physical blocks according to an embodiment of the present invention.

Moreover, in the present embodiment, the controller 110 may execute the machine commands of the memory management module 110b to operate the flash memory 130 in a way similar to that shown in FIG. 1A and FIG. 1B. Namely, the physical blocks 130-0 to 130-N are grouped into a data area 204 and a spare area 206, and accessing of the blocks is performed in an alternation approach as that utilizing the aforementioned substitute physical block 208. Moreover, the memory management module 110b can provide a plurality of logical blocks 140-0 to 140-M (as shown in FIG. 4) to map the physical blocks linked to the data area 204 for being provided to the host 200 for accessing.

It should be noted that the micro-processing unit 110a of the present embodiment may execute the machine commands of the memory management module 110b to divide each of the physical blocks 130-0 to 130-N into a plurality of physical parts, and each of the logical blocks 140-0 to 140-M maps to the physical parts of each of the physical blocks 130-0 to 130-N. Therefore, when the host accesses the logical blocks 140-0 to 140-M, the memory management module 110b performs the accessing according to the mapped physical parts. In the following content, the data management steps of the present embodiment are described in detail with reference of figures.

It should be noted that the terms used for describing operations of the flash memory such as "select", "move", "exchange" etc. for operating the physical blocks of the data area 204 and the spare area 206 are only logical concepts. Namely, the physical blocks of the flash memory are only operated logically, and actual positions of the physical blocks are not changed.

FIG. 3 is a flowchart illustrating a data management method according to an embodiment of the present invention. FIG. 4 is a schematic diagram illustrating a mapping relationship between the logical blocks 140-0 to 140-M and the physical blocks 130-0 to 130-N according to an embodiment of the present invention.

Referring to FIG. 3 and FIG. 4, the micro-processing unit 110a of the controller 110 executes the machine commands of the memory management module 110b to implement the following data management steps. In step S301, a plurality of the logical blocks is configured for being accessed by the host 200. As described above, based on the erase and program characteristics of the flash memory, data is stored in the physical blocks store data with the alternation approach. Therefore, in the step S301, the logical blocks 140-0 to 140-M (shown as FIG. 4) are configured for being accessed by the host 200.

Next, in step S303, each of the physical blocks is divided into a plurality of the physical parts, and in step S305, the configured logical blocks are respectively mapped to the divided physical parts. For example, as shown in FIG. 4, each of the physical blocks 130-0 to 130-N is divided into an upper physical part and a lower physical part, and each of the logical blocks 140-0 to 140-M maps to the upper physical part or the lower physical part of one of the physical blocks 130-0 to 130-N. In other words, one physical block maps to two logical blocks. In the present embodiment, the physical part of each of the physical blocks 130-0 to 130-N is continuous pages. However, in another embodiment of the present invention discontinuous pages can also be applied to divide the physical blocks, for example, the 0th, 2nd, 4th, . . . pages are the upper physical part, and the 1st, 3rd, 5th, . . . pages are the lower physical part.

Next, in step S307, a mapping relation that a plurality of the logical blocks maps to one physical block is recorded in the buffer memory 110d. For example, in the present embodiment, the mapping relation is stored in a logical-physical block mapping table in the buffer memory 110d.

Finally, in step S309, the mapped physical parts are accessed by referring to the logical-physical block mapping table according to the logical blocks to be accessed by the host 200.

It should be noted that during the writing operation shown as FIG. 1A and FIG. 1B, after combination of the physical parts mapped to the specific logical blocks is completed (i.e. the physical parts having the mother-child relation are combined), the physical part referring to the mother block becomes an invalid physical part, so that the invalid physical part is ready to be erased and re-linked to the spare area 206 for utilization of follow-up data writing. However, since one physical block maps to a plurality of logical blocks, after the combination, the physical block that the invalid physical part is belonged may still have valid physical parts mapped to other logical blocks, so that the physical block that the invalid physical part is belonged cannot be immediately erased. Therefore, under a structure of the present embodiment (i.e. a plurality of the logical blocks maps to one physical block), specific writing steps have to be performed to avoid decreasing of utilization efficiency of the physical blocks due to excessive dispersion of the invalid physical parts.

Figure 5A:
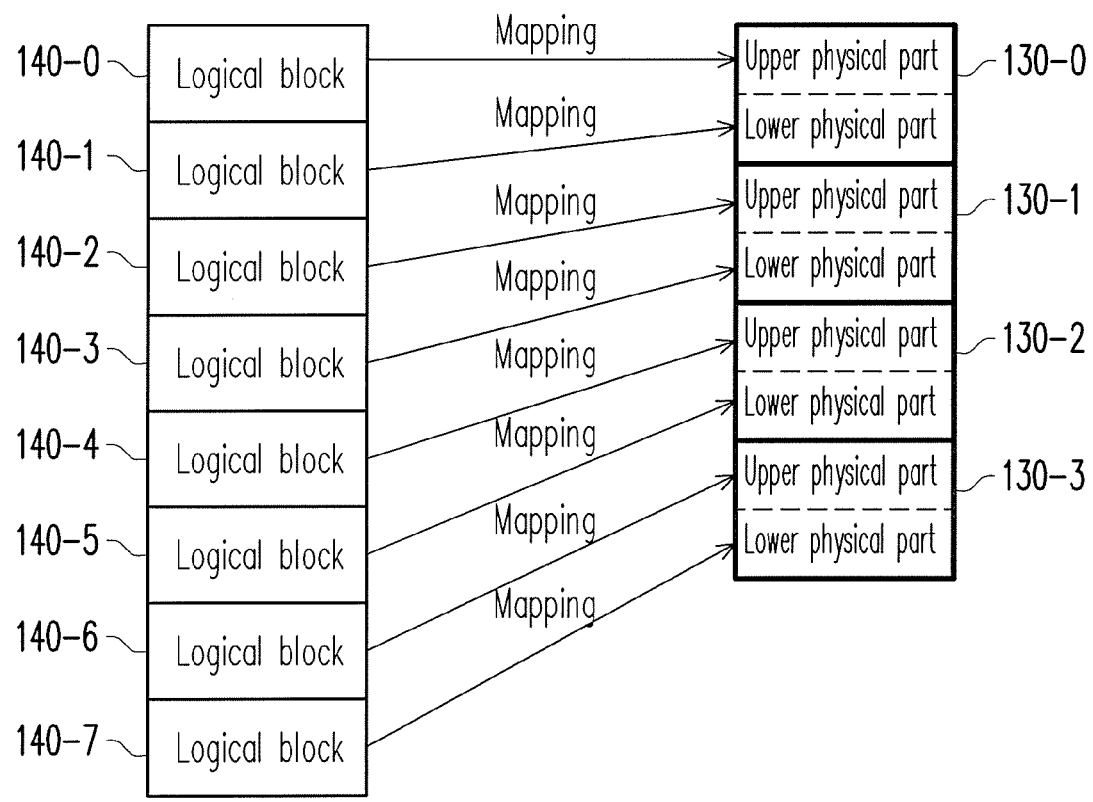
FIG. 5A and FIG. 5B are schematic diagrams illustrating operations for substituting physical blocks according to an embodiment of the present invention.
Figure 5B:
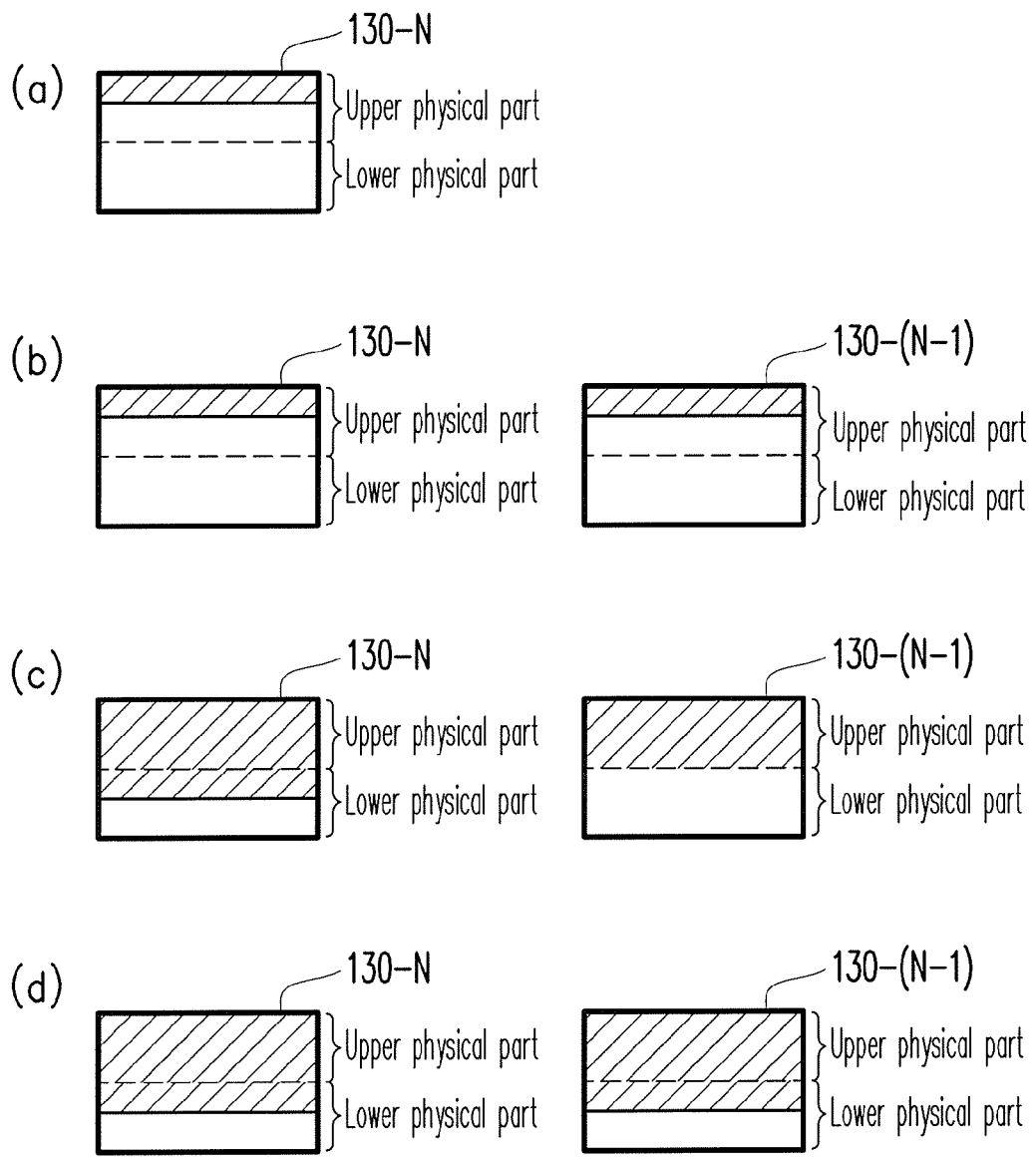

FIG. 5A and FIG. 5B are schematic diagrams illustrating operations for substituting physical blocks. FIG. 5A is a diagram illustrating a present data storage state. The logical block 140-0 maps to the upper physical part of the physical block 130-0, the logical block 140-1 maps to the lower physical part of the physical block 130-0, the logical block 140-2 maps to the upper physical part of the physical block 130-1, the logical block 140-3 maps to the lower physical part of the physical block 130-1, the logical block 140-4 maps to the upper physical part of the physical block 130-2, the logical block 140-5 maps to the lower physical part of the physical block 130-2, the logical block 140-6 maps to the upper physical part of the physical block 130-3, and the logical block 140-7 maps to the lower physical part of the physical block 130-3. Moreover, the controller 110 sequentially receives writing commands from the host 200 for writing data to the logical blocks 140-0, 140-2, 140-4 and 140-6, and temporary relations of two mother-child blocks are recorded in the buffer memory 110d.

Referring to FIG. 5B, when the controller 110 receives the writing command for writing data to the logical block 140-0, a physical block (for example, the physical block 130-N) is selected from the spare area 206 to serve as a first substitute physical block, and similar to the operations shown as (a) and (b) of FIG. 1B, the valid old data on the upper physical part of the physical block 130-0 originally mapped to the logical block 140-0 and the new data to be written are written to the upper physical part of the first substitute physical block 130-N (shown as (a) of FIG. 5). Now, the controller 110 completes the writing operation and responses the host 200 that writing operation is completed, and enters a stand-by state.

Next, when the controller 110 receives the writing command for writing data to the logical block 140-2, a physical block (for example, the physical block 130-(N−1)) is selected from the spare area 206 to serve as a second substitute physical block, and similar to the operations shown as (a) and (b) of FIG. 1B, the valid old data on the upper physical part of the physical block 130-1 originally mapped to the logical block 140-2 and the new data to be written are written to the upper physical part of the second substitute physical block 130-(N−1) (shown as (b) of FIG. 5). Now, the controller 110 completes the writing operation and responses the host 200 that writing operation is completed, and enters the stand-by state.

Next, when the controller 110 receives the writing command for writing data to the logical block 140-4, since the buffer memory 110d is configured to only recorded with the temporary relations for two mother-child blocks, similar to the operations shown as (c) of FIG. 1B, the controller 110 moves the remained valid old data on the upper physical part of the physical block 130-0 originally mapped to the logical block 140-0 to the upper physical part of the first substitute physical block 130-N, and marks the upper physical part of the physical block 130-0 to be invalid. Now, the logical block 140-0 in the logical-physical block mapping table is updated for mapping to the upper physical part of the physical block 130-N. It should be noted that the physical block 130-0 still has valid data of the logical block 140-1, so that the physical block 130-0 is not erased, but in a state that only partial storage capacity can be utilized. Since the combination of data of the logical block 140-0 is completed, the lower physical pat of the first substitute physical block then can serve as a substitute physical block for the logical block 140-4. Namely, based on the operations shown as (a) and (b) of FIG. 1B, the controller 110 moves the valid old data on the upper physical part of the physical block 130-2 originally mapped to the logical block 140-4 and the new data to be written to the lower physical part of the first substitute physical block 130-N (shown as (c) of FIG. 5). The controller 110 completes the writing operation and responses the host 200 that writing operation is completed, and enters the stand-by state.

Finally, when the controller 110 receives the writing command for writing data to the logical block 140-6, similar to the operations shown as (c) of FIG. 1B, the controller 110 moves the remained valid old data on the upper physical part of the physical block 130-1 originally mapped to the logical block 140-2 to the upper physical part of the second substitute physical block, and marks the upper physical part of the physical block 130-1 originally mapped to the logical block 140-2 to be invalid. Now, the logical block 140-2 is updated for mapping to the upper physical part of the physical block 130-(N−1). Similarly, the physical block 130-1 still has invalid data of the logical block 140-3, so that the physical block 130-1 is not erased, but in a state that only partial storage capacity can be utilized. Next, based on the operations shown as (a) and (b) of FIG. 1B, the controller 110 moves the valid old data on the upper physical part of the physical block 130-3 originally mapped to the logical block 140-6 and the new data to be written to the lower physical part of the second substitute physical block (shown as (d) of FIG. 5). Now, the controller 110 completes the writing operation and responses the host 200 that writing operation is completed, and enters the stand-by state.

As shown in (a)-(d) of FIG. 5B, the upper part of the substitute physical block is first utilized for being written with data, and the lower parts of the substitute physical blocks are utilized for being written with data only when the upper physical parts of all of the substitute physical blocks are utilized.

It should be noted that after the aforementioned operations, there are the physical blocks with only partial data being valid in the data area. Therefore, the controller 110 must combine one of the physical block containing only partial valid physical parts if data is to be written to other logical blocks (i.e. not the logical blocks 140-4 and 140-6) under a state shown as (d) of FIG. 5B.

For example, assuming the host 200 is about to write data to the logical block 140-7, the controller 110 first combines a mother-child block. For example, similar to the operations shown as (c) of FIG. 1B, the controller 110 moves the remained valid old data on the upper physical part of the physical block 130-2 originally mapped to the logical block 140-4 to the lower physical part of the first substitute physical block, and marks the upper physical part of the physical block 130-2 originally mapped to the logical block 140-4 to be invalid. Now, the controller 110 for example, selects a physical block 130-(N−2) from the spare area 206 to be a new substitute physical block and moves data of the valid part (i.e. the lower physical part) of the physical block 130-0 to the upper physical part of the new substitute physical block 130-(N−2), and marks the lower physical part of the physical block 130-0 originally mapped to the logical block 140-1 to be invalid. Next, similar to the operations shown as (a) and (b) of FIG. 1B, the controller 110 continually writes data of the logical block 140-7 to the lower physical part of the physical block 130-(N−2). Now, the logical block 140-1 is updated for mapping to the upper physical part of the physical block 130-(N−2), and there is no valid data in the physical block 130-0, so that the physical block 130-0 can be erased and linked to the spare area 206.

It should be noted that in the present embodiment, in the steps shown as (c) of FIG. 5B, if the controller 110 performs the random writing mode to the logical block 140-0 and the logical block 140-4, the controller 110 does not immediately combine the logical block 140-0, but may directly write the data to be written into the logical block 140-0 and the logical block 140-4 to the substitute physical block 130-N, sequentially. Namely, during the random writing mode, each of the substitute physical blocks (referred to as random substitute physical block) may record the data to be written into two logical blocks. Accordingly, one random substitute physical block may support two logical blocks with the random writing mode. Therefore, the utilization efficiency of the physical blocks during the random writing mode can be improved, and speed of the random writing mode can also be improved.

In summary, in the present invention, the physical blocks are divided into a plurality of physical parts, and the divided physical parts are mapped to the logical blocks. Accordingly, since block accessing can be performed base on a structure of multi logical blocks mapping to a physical block, number of times for combining the physical blocks can be reduced, and accordingly the block accessing speed is improved. Particularly, when the flash memory storage system enters the random writing mode, since one physical block may support the random writing of multi logical blocks, speed of the random writing mode can be greatly improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data management method, for accessing a flash memory of a flash memory storage system, wherein the flash memory comprises a plurality of physical blocks and the physical blocks are at least grouped into a data area and a spare area, the data management method comprising:

configuring a plurality of logical blocks for being accessed by a host;

dividing each of the physical blocks into a plurality of physical parts including at least an upper physical part and a lower physical part and respectively mapping the logical blocks to the physical parts;

accessing the physical parts according to the logical blocks to be accessed by the host, wherein each of the physical blocks maps to at least two of the logical blocks;

selecting a plurality of the physical blocks from the spare area to serve as substitute physical blocks and substituting the physical parts mapping the logical blocks in the data area with the physical parts of the substitute physical blocks when the host writes data to the logical blocks, wherein the upper physical parts of the substitute physical blocks are first utilized to be written with the data, and the lower physical parts of the substitute physical blocks are utilized to be written with the data after the upper physical parts of the substitute physical blocks are utilized; and moving valid data of at least one physical block in the data area to a new physical block selected from the spare area when the upper physical parts and the lower physical parts of all of the substitute physical blocks are utilized, wherein only one of the upper physical part and the lower physical part store valid data in the at least one physical block.

2. The data management method as claimed in claim 1, further comprising recording the physical block and the physical part mapped to each of the logical block in a logical-physical block mapping table.

3. The data management method as claimed in claim 1, wherein the physical parts mapped to the logical blocks are continuous pages or discontinuous pages in each of the physical blocks.

4. The data management method as claimed in claim 1, further comprising selecting a plurality of physical blocks from the spare area to serve as random substitute physical blocks and recording data to be written into two logical blocks into each of the random substitute physical blocks when the host writes data into the logical blocks in a random writing mode.

5. A controller, for a storage device having a flash memory, wherein the flash memory includes a plurality of physical blocks and the physical blocks are at least grouped into a data area and a spare area, the controller comprising:

a micro-processing unit;

a flash memory interface, coupled to the micro-processing unit;

a buffer memory, coupled to the micro-processing unit; and a memory management module, coupled to the micro-processing unit and has a plurality of machine commands that can be executed by the micro-processing unit for performing a plurality of data management steps for the flash memory, wherein the data management steps comprise:

configuring a plurality of logical blocks for being accessed by a host;

dividing each of the physical blocks into a plurality of physical parts including at least an upper physical part and a lower physical part and respectively mapping the logical blocks to the physical parts;

accessing the physical parts according to the logical blocks to be accessed by the host, wherein each of the physical blocks maps to at least two of the logical blocks;

selecting a plurality of the physical blocks from the spare area to serve as substitute physical blocks and substituting the physical parts mapping the logical blocks in the data area with the physical parts of the substitute physical blocks when the host writes data to the logical blocks, wherein the upper physical parts of the substitute physical blocks are first utilized to be written with the data, and the lower physical parts of the substitute physical blocks are utilized to be written with the data after the upper physical parts of the substitute physical blocks are utilized; and moving valid data of at least one physical block in the data area to a new physical block selected from the spare area when the upper physical parts and the lower physical parts of all of the substitute physical blocks are utilized, wherein only one of the upper physical part and the lower physical part store valid data in the at least one physical block.

6. The controller as claimed in claim 5, wherein the data management steps further include recording the physical block and the physical part mapping to each of the logical blocks in a logical-physical block mapping table, wherein the logical-physical block mapping table is stored in the buffer memory.

7. The controller as claimed in claim 5, wherein the physical parts mapping to the logical block are continuous pages or discontinuous pages in each of the physical blocks.

8. The controller as claimed in claim 5, wherein the data management steps further comprise selecting a plurality of physical blocks from the spare area to serve as random substitute physical blocks and recording data to be written into two logical blocks into each of the random substitute physical blocks when the host writes data into the logical blocks in a random writing mode.

9. The controller as claimed in claim 5, wherein the storage device is a flash drive, a flash memory card or a solid state drive.

10. A storage system, comprising:
a flash memory, having a plurality of physical blocks, wherein the physical blocks are at least grouped into a data area and a spare area;
a transmission link interface; and
a controller, coupled to the flash memory and the transmission link interface, the controller executing a plurality of machine commands of a memory management module for executing a plurality of data management steps, the data management steps comprise:
configuring a plurality of logical blocks for being accessed by a host;
dividing each of the physical blocks into a plurality of physical parts including at least an upper physical part and a lower physical part and respectively mapping the logical blocks to the physical parts;
accessing the physical parts according to the logical blocks to be accessed by the host, wherein each of the physical blocks maps to at least two of the logical blocks; and
moving valid data of at least one physical block in the data area to a new physical block selected from the spare area when the upper physical parts and the lower physical parts of all of the substitute physical blocks are utilized, wherein only one of the upper physical part and the lower physical part store valid data in the at least one physical block.

11. The storage system as claimed in claim 10, wherein the data management steps further comprise recording the physical block and the physical part mapping to each of the logical blocks in a logical-physical block mapping table, wherein the logical-physical block mapping table is stored in a buffer memory of the controller.

12. The storage system as claimed in claim 10, wherein the physical parts mapping to the logical blocks are continuous pages or discontinuous pages in each of the physical blocks.

13. The storage system as claimed in claim 10, wherein the data management steps further comprise selecting a plurality of the physical blocks from the spare area to serve as substitute physical blocks and substituting the physical parts mapping the logical blocks in the data area with the physical parts of the substitute physical blocks when the host writes data to the logical blocks, wherein the upper physical parts of the substitute physical blocks are first utilized to be written with the data, and the lower physical parts of the substitute physical blocks are utilized to be written with the data after the upper physical parts of the substitute physical blocks are utilized.

14. The storage system as claimed in claim 10, wherein the data management steps further comprise selecting a plurality of physical blocks from the spare area to serve as random substitute physical blocks and recording data to be written into two logical blocks into each of the random substitute physical blocks when the host writes data into the logical blocks in a random writing mode.

* * * * *